US012756138B2

(12) United States Patent
Tao et al.

(10) Patent No.: US 12,756,138 B2
(45) Date of Patent: Oct. 6, 2026

(54) MAGNETIC CONNECTOR ASSEMBLY

(71) Applicant: Dongguan Leader Precision Industry Co., Ltd., Dongguan City (CN)

(72) Inventors: Deping Tao, Dongguan City (CN); Zhou Wang, Dongguan City (CN); Hongqiang Xu, Dongguan City (CN); Lijun Xu, Dongguan City (CN)

(73) Assignee: DONGGUAN LEADER PRECISION INDUSTRY CO., LTD., Dongguan City (CN)

( * ) Notice: Subject to any disclaimer, the term of this patent is extended or adjusted under 35 U.S.C. 154(b) by 405 days.

(21) Appl. No.: 18/456,038

(22) Filed: Aug. 25, 2023

(65) Prior Publication Data

US 2024/0235107 A1 Jul. 11, 2024

(30) Foreign Application Priority Data

Jan. 9, 2023 (CN) ......................... 202320052591.1

(51) Int. Cl.
*H01R 13/62* (2006.01)
*H01R 13/64* (2006.01)
*H01R 13/6581* (2011.01)

(52) U.S. Cl.
CPC ......... *H01R 13/6205* (2013.01); *H01R 13/64* (2013.01); *H01R 13/6581* (2013.01)

(58) Field of Classification Search
CPC . H01R 13/6205; H01R 13/64; H01R 13/6581
See application file for complete search history.

(56) References Cited

U.S. PATENT DOCUMENTS 7,445,452 B1 * 11/2008 Wu .................... H01R 13/6205 439/39
7,497,693 B1 * 3/2009 Wu .................... H01R 13/2442 439/39
7,566,224 B2 * 7/2009 Wu .................... H01R 13/6205 439/39
9,362,664 B2 * 6/2016 Yen .................... H01R 13/6205
9,385,471 B2 * 7/2016 Zhu .................... H01R 13/6205
9,515,420 B2 * 12/2016 Daoura ................ H01R 13/502
(Continued)

FOREIGN PATENT DOCUMENTS

CN 204144588 U 2/2015
CN 105186192 A 12/2015
(Continued)

*Primary Examiner* — Thanh Tam T Le
(74) *Attorney, Agent, or Firm* — MUNCY, GEISSLER, OLDS & LOWE, P.C.

(57) ABSTRACT

A magnetic connector assembly prevents magnets from making an interference in signal transmission of terminals and prevents incorrect insertion. The magnetic connector assembly includes a first connector and a second connector. The first connector includes a fixed case, and a first plastic body with a jointing groove is disposed outside the fixed case. A circuit board with a first PIN module is disposed inside of the fixed case. The second connector includes a second PIN module disposed on a second plastic body with an inner case. An inserting part is disposed on one end of the inner case far away from the second plastic body. When the first connector and the second connector are jointed, the inserting part of the inner case is inserted into the jointing groove.

13 Claims, 6 Drawing Sheets

(56) References Cited

U.S. PATENT DOCUMENTS

| | | | | |
|---|---|---|---|---|
| 9,755,370 | B2 * | 9/2017 | Little | H01R 13/652 |
| 9,991,628 | B2 * | 6/2018 | Daoura | H01R 13/6205 |
| 10,069,265 | B2 * | 9/2018 | Wu | H02J 7/00 |
| 10,096,932 | B2 * | 10/2018 | Chang | H01R 13/74 |
| 10,333,249 | B1 * | 6/2019 | Wang | H01R 13/6205 |
| 10,396,491 | B2 * | 8/2019 | Hsu | H01R 13/6205 |
| 10,396,494 | B2 * | 8/2019 | Little | H01R 12/7023 |
| 10,483,688 | B2 * | 11/2019 | Wrisley | H01R 13/665 |
| 10,559,917 | B2 * | 2/2020 | Wang | H01R 13/745 |
| 10,707,610 | B1 * | 7/2020 | Wang | H01R 13/6205 |
| 10,978,826 | B2 * | 4/2021 | Li | H01R 13/504 |
| 11,213,074 | B2 * | 1/2022 | Antonopoulos | A24F 40/40 |
| 11,289,849 | B2 * | 3/2022 | Jani | H01R 13/6205 |
| 11,296,457 | B2 * | 4/2022 | Zhang | H01R 24/60 |
| 11,728,602 | B2 * | 8/2023 | Deng | H01R 31/06<br>439/39 |
| 11,791,591 | B2 * | 10/2023 | Fong | H01R 13/6205<br>439/39 |
| 11,962,115 | B2 * | 4/2024 | Feng | H01R 13/6658 |

FOREIGN PATENT DOCUMENTS

| | | |
|---|---|---|
| CN | 212784014 U | 3/2021 |
| CN | 114447690 A | 5/2022 |

* cited by examiner

MAGNETIC CONNECTOR ASSEMBLY

CROSS-REFERENCE TO RELATED APPLICATIONS

This non-provisional application claims priority claim under 35 U.S.C. § 119(a) on China patent application Ser. No. 20/232,00525911 filed Jan. 9, 2023, the entire contents of which are hereby incorporated by reference.

FIELD OF THE INVENTION

The present disclosure relates to a field of a connector, and particularly relates to the insertion structure of the connector with magnet attraction. The present disclosure mainly relates to a magnetic connector assembly with fool-proofing and interference prevention.

BACKGROUND OF THE INVENTION

As continuous development of electronic products, connectors are widely utilized and applied in the charge and the signal transmission of the electronic products to adapt the capability trend of being faster, being more compatible, and being more durable, etc.

SUMMARY OF THE INVENTION

In order to overcome the drawback of the conventional technology, the object of the present disclosure is to provide a magnetic connector assembly which prevents magnets from making an interference in signal transmission of terminals. And the magnetic connector assembly prevents incorrect insertion and has fool-proofing.

In order to solve the problem of the conventional technology, the present disclosure adopt the technical solution as follows:

A magnetic connector assembly includes a first connector and a second connector. The first connector includes a fixed case outside which a first plastic body is disposed. The first plastic body has a jointing groove.

A circuit board is disposed inside of the fixed case and has a first PIN module. The fixed case, the circuit board and a part of the first PIN module are disposed in the first plastic body by mounting process.

The second connector includes a second PIN module disposed on a second plastic body by the mounting process. The second plastic body is disposed with an inner case. An inserting part is disposed on one end of the inner case extending outward and far away from the second plastic body.

When the first connector and the second connector are jointed, the inserting part of the inner case is inserted into the jointing groove, and the second PIN module contacts the first PIN module and is disposed on the first PIN module.

In some embodiments, the first connector includes a plurality of terminals disposed in an insulation case. An outer case is disposed outside of the insulation case, the insulation case is disposed within the outer case and one end of the outer case is fixed to the fixed case by welding.

In some embodiments, the fixed case includes a first annular portion, a second annular portion and a step. The outer diameter of the second annular portion is greater than the outer diameter of the first annular portion. The step is disposed between the first annular portion and the second annular portion for connecting the first annular portion and the second annular portion. The inner surfaces of the step and the second annular portion are partially exposed in the jointing groove.

In some embodiments, the circuit board is disposed within the second annular portion, and the inner surface of the step close to an outer edge and the inner wall of the second annular portion are exposed in the jointing groove.

The first connector includes a first magnet and a second magnet. The first magnet is disposed on one side of the first plastic body. The second magnet is disposed on the other side of the first plastic body.

The first magnet and the second magnet are disposed on one end of the first plastic body far away from the outer case and protruding outside of the first plastic body, and outer ends of the first magnet and the second magnet are higher than an outer end of the first plastic body.

In some embodiments, the second connector includes a third magnet and a fourth magnet. The third magnet is disposed on one side of the inner case, and the fourth magnet is disposed on the other side of the inner case.

The third magnet and the fourth magnet are disposed on one end of the inner case far away from the second plastic body and closely adjacent to the second plastic body, and the inner case and the fixed case are located among the first magnet, the second magnet, the third magnet, the fourth magnet, the first PIN module and the second PIN module.

In some embodiments, the end of the inner case protrudes outside of the third magnet and the fourth magnet and forms the inserting part.

The second connector further includes a plurality of shrapnel. The plurality of shrapnel is disposed on the case sidewall of the one end of the inner case far away from the second plastic body and is located on the sidewall of the inserting part of the inner case protruding outside the third magnet and the fourth magnet. The plurality of shrapnel tightly contacts the inner wall of the second annular portion when the first connector and the second connector are jointed.

In some embodiments, the inserting part of the inner case is inserted into the second annular portion.

The fixed case further includes a plurality of protrusions. The plurality of protrusions protrude inward on the sidewall of the second annular portion and tightly contact the outer wall of the inserting part when the first connector and the second connector are jointed.

In some embodiments, one side face of the first magnet close to the third magnet is a south pole, and one side face of the third magnet close to the first magnet is a north pole. One side face of the second magnet close to the fourth magnet is the north pole, and one side face of the fourth magnet close to the second magnet is the south pole.

In some embodiments, one side face of the first magnet far away from the third magnet is a north pole, one side face of the third magnet far away from the first magnet is a south pole, one side face of the second magnet far away from the fourth magnet is the south pole, and one side face of the fourth magnet far away from the second magnet is the north pole.

In some embodiments, the circuit board is disposed on one end of the insulation case, and a soldering terminal of each of the plurality of terminals is disposed on the circuit board. The first PIN module is disposed on one side of the circuit board far away from the plurality of terminals, and the first PIN module is disposed on the circuit board and is electrically connected to the circuit board.

The first connector further includes a middle partition and a terminal carrier. The middle partition is disposed between adjacent two of the plurality of terminals. The terminal carrier is disposed outside the plurality of terminals, and the plurality of terminals and the middle partition are combined and embedded in the terminal carrier. The outside of the terminal carrier is encased with the insulation case.

The present disclosure ensures the stability of contact between two iron cases with the grounded magnetic attraction heads, one of the two iron cases would be generally planned to have one piece of shrapnel or one protrusion and the one piece of shrapnel may be planned to be disposed on the iron case with the magnetic attraction head. In other words, the second connector has an inner iron case, and the one piece of shrapnel is disposed on the inner iron case.

When the first connector and the second connector are jointed, the inner iron case would be inserted into the limit groove (the second annular portion) of the first connector, and the inner case (inner iron case) is located among the first PIN module, the second PIN module and the magnet. The inner case serves as the terminal preventing the static interference of the magnet to prevent the magnet from making the interference in the signal transmission of the terminals and thus the inner case achieves EMI static shielding. The protrusion may be further disposed on the first connector, and the protrusion may be planned to be on the second annular portion with the fixed case to ensure the stability of the contact between the two iron cases with the grounded magnetic attraction heads.

THE DRAWINGS

DETAILED DESCRIPTION

In order to understand more about the features, the technical solutions and the objects and the functions of the present disclosure, the embodiments of the present disclosure and the features in the embodiments of the present disclosure may be combined with each other without conflict. In order to understand more about the features, the technical solutions and the objects and the functions of the present disclosure, the advantages and the spirit of the present disclosure are analyzed, and the detailed description of the present disclosure would be further understood by combing the accompanying drawings and the detailed description as below.

It should be noted that when one element "is fixed on" or "is disposed on" another element, it may be directly on another element or there is a middle element between two elements. When one element "is connected to" another element, it may be directly connected to another element or there is a middle element between two elements. The terms "vertical", "horizontal", "forward", "backward", etc. in the specification are merely for the purpose of explanation and are not intended to represent the only implementation.

Figure 1:
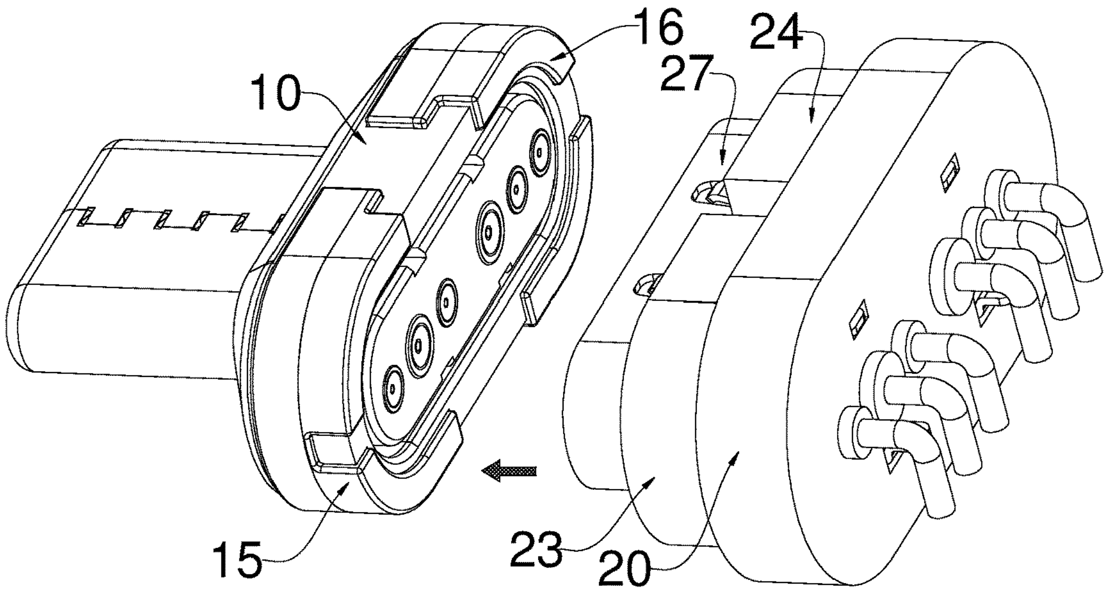
FIG. 1 is a using schematic diagram according to one embodiment of the present disclosure.
Figure 3:
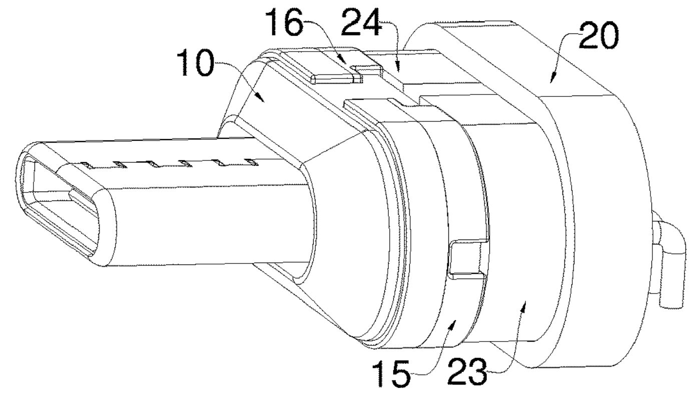
FIG. 3 is a 3D schematic diagram according to one embodiment of the present disclosure.

The magnetic connector assembly of the present disclosure with fool-proofing and shielding includes a first connector 10 and a second connector 20. Please refer to FIG. 1 and FIG. 3, which are a using schematic diagram of the magnetic connector assembly provided by the present disclosure and a 3D schematic diagram of the present disclosure. The magnetic connector assembly of the present disclosure is composed of the first connector 10 and the second connector 20 and is divided into two matched parts: the first connector 10 and the second connector 20.

Figure 14:
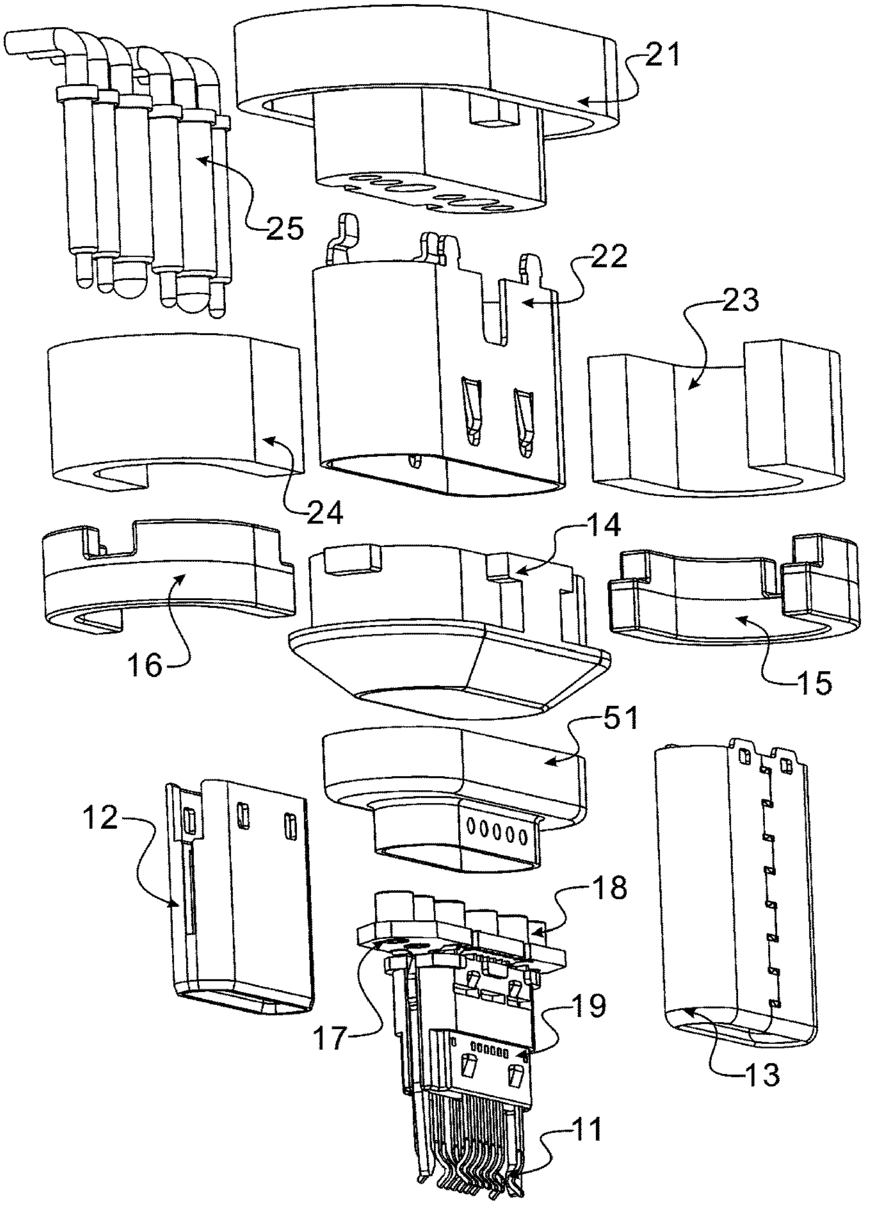
FIG. 14 is an exploded structural diagram according to one embodiment of the present disclosure.

In order to further explain the features and the technical solutions of the present disclosure, please refer to FIG. 14, which is an exploded structural diagram of the first connector 10 and the second connector 20 of the present disclosure.

Figure 5:
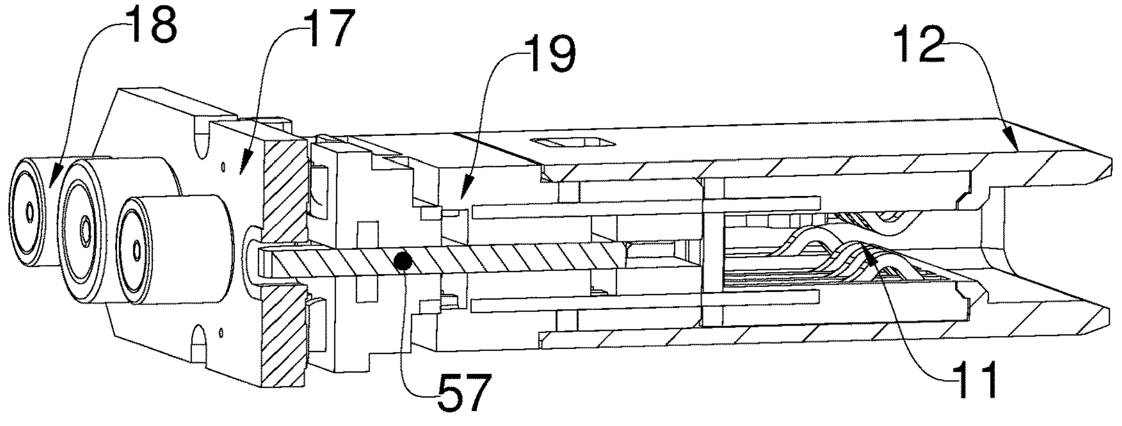
FIG. 5 is a partial cross section structural diagram of a plurality of terminals according to one embodiment of the present disclosure.
Figure 7:
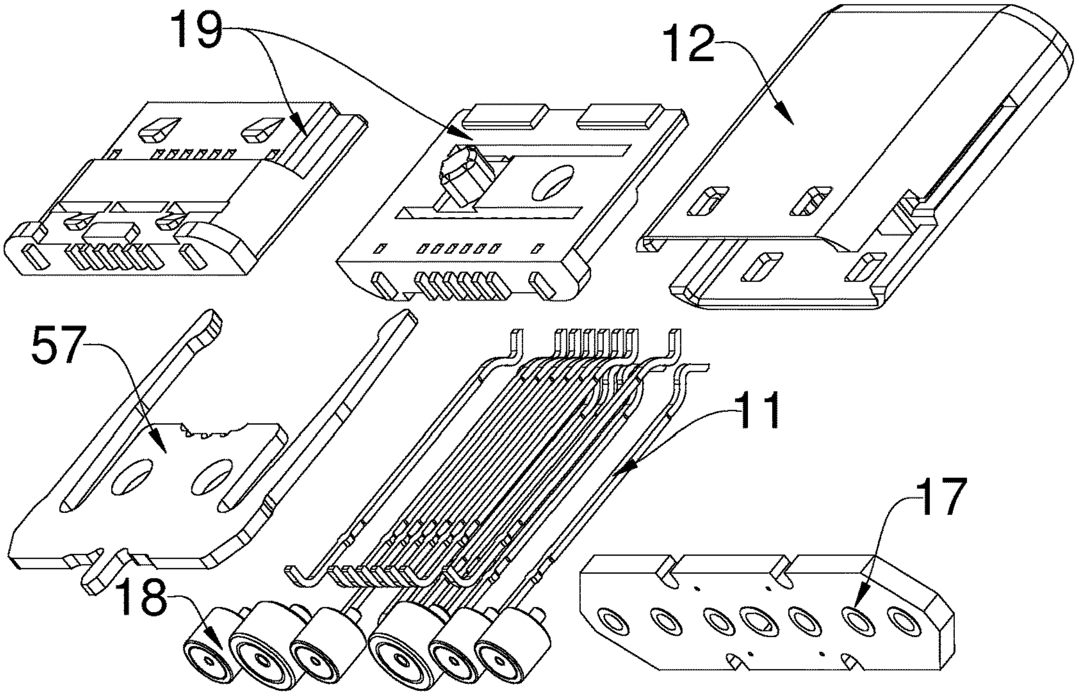
FIG. 7 is an exploded schematic diagram of the plurality of terminals according to one embodiment of the present disclosure.

Furthermore, in some embodiments, please refer to FIG. 5 and FIG. 7, which are a partial cross section structural diagram of a plurality of terminals 11 of the magnetic connector assembly provided by the present disclosure and an exploded schematic diagram of the plurality of terminals 11 of the present disclosure. The first connector 10 includes a plurality of terminals 11, a middle partition 57 is disposed between adjacent two of the plurality of terminals 11 and a terminal carrier 19 is disposed outside the plurality of terminals 11. The plurality of terminals 11 and the middle partition 57 are combined and embedded in the terminal carrier 19, and the outside of the terminal carrier 19 is encased with an insulation case 12. A circuit board 17 is disposed on one end of the insulation case 12, a soldering terminal of each of the plurality of terminals 11 is disposed on the circuit board 17 and the plurality of terminals 11 is electrically connected to the circuit board 17. A first PIN module 18 is disposed on one side of the circuit board 17 far away from the plurality of terminals 11, and the first PIN module 18 is disposed on the circuit board 17 and is electrically connected to the circuit board 17.

Figure 2:
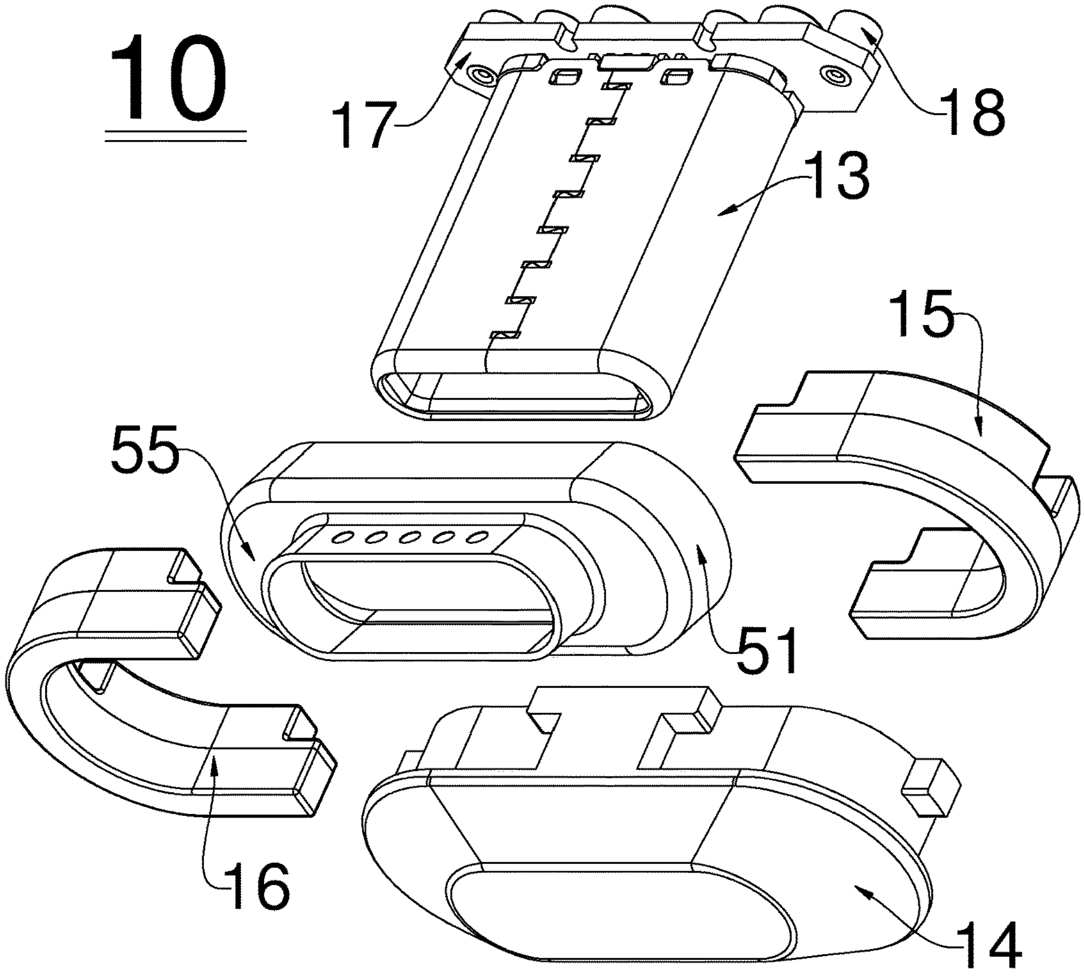
FIG. 2 is an exploded schematic diagram of a first connector according to one embodiment of the present disclosure.
Figure 8:
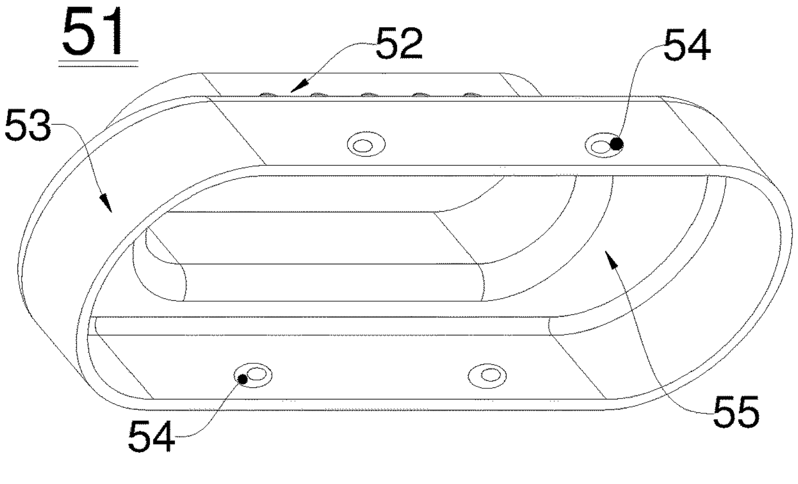
FIG. 8 is a structural schematic diagram of a fixed case according to one embodiment of the present disclosure.

Please refer to FIG. 2, which is an exploded schematic diagram of the first connector 10 of the present disclosure. An outer case 13 is disposed outside of the insulation case 12, and the insulation case 12 is disposed within the outer case 13. A fixed case 51 is disposed outside of the outer case 13, and the outer case 13 is encased with the fixed case 51. Furthermore, please refer to FIG. 8, which is a structural schematic diagram of the fixed case 51 of the present disclosure. The fixed case 51 includes a first annular portion 52, a second annular portion 53 and a step 55 disposed between the first annular portion 52 and the second annular portion 53. The outer diameter of the second annular portion 53 is greater than the outer diameter of the first annular portion 52, and the first annular portion 52 and the second annular portion 53 are connected by the step 55.

Figure 12:
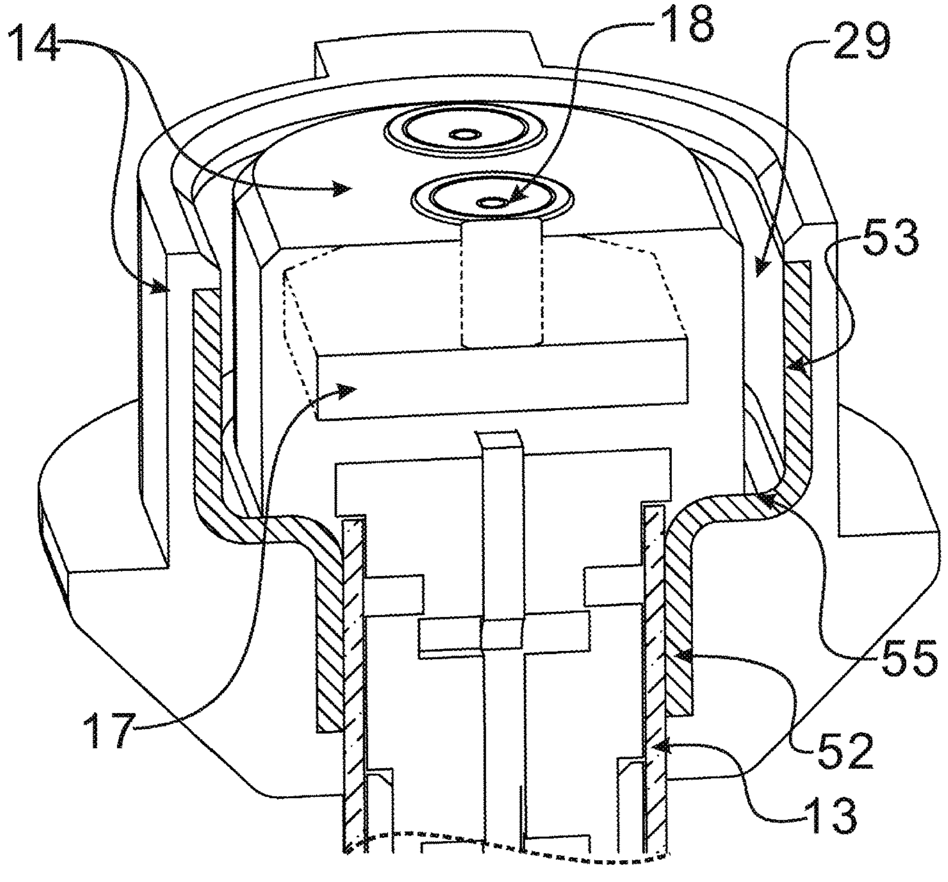
FIG. 12 is a partial cross section structural diagram of a jointing groove according to one embodiment of the present disclosure.

Please refer to FIG. 12, which is a partial cross section structural diagram of a jointing groove 29. As seen from FIG. 12, the inner surfaces of the step 55 of the second annular portion 53 are partially exposed in the jointing groove 29. Furthermore, the inner surface of the step 55 close to an outer edge and the inner wall of the second annular portion 53 are exposed in the jointing groove 29.

The second annular portion 53 and the step 55 are combined to form an electrical insertion structure.

Figure 13:
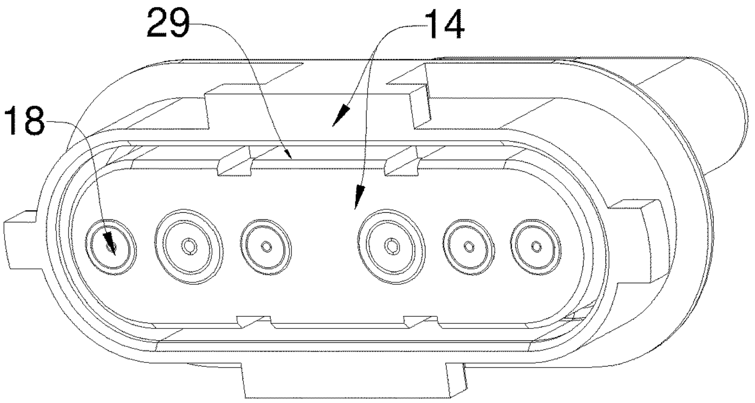
FIG. 13 is a partial 3D schematic diagram of the jointing groove according to one embodiment of the present disclosure.

Furthermore, please refer to FIG. 2, which is an exploded schematic diagram of the first connector 10. The outer case 13 is encased with the first annular portion 52, and the outer case 13 and the first annular portion 52 are connected by welding. The circuit board 17 is disposed within the second annular portion 53, and a first plastic body 14 is disposed outside the fixed case 51. The annular jointing groove 29 is disposed on one end of the first plastic body 14, and please refer to FIG. 13 which is a partial 3D schematic diagram of the jointing groove 29.

When the first connector 10 and the second connector 20 are jointed, the inserting part 27 of an inner case 22 is inserted into the jointing groove 29, and the shape of the inserting part 27 matches the shape of the jointing groove 29. In the other embodiments, the shape of the jointing groove 29 may be a horseshoe shape or an arc shape.

The fixed case 51, the circuit board 17 and some of the first PIN module 18 are disposed in the first plastic body 14 by mounting process. A first magnet 15 and a second magnet 16 are disposed on two sides of the first plastic body 14 and are disposed on one end of the first plastic body 14 far away from the outer case 13. Please refer to FIG. 1, one ends (outer ends) of the first magnet 15 and the second magnet 16 far away from the outer case 13 protrude outside the first plastic body 14. In other words, the outer end of the first magnet 15 and the outer end of the second magnet 16 are higher than the outer end of the first plastic body 14.

Figure 4:
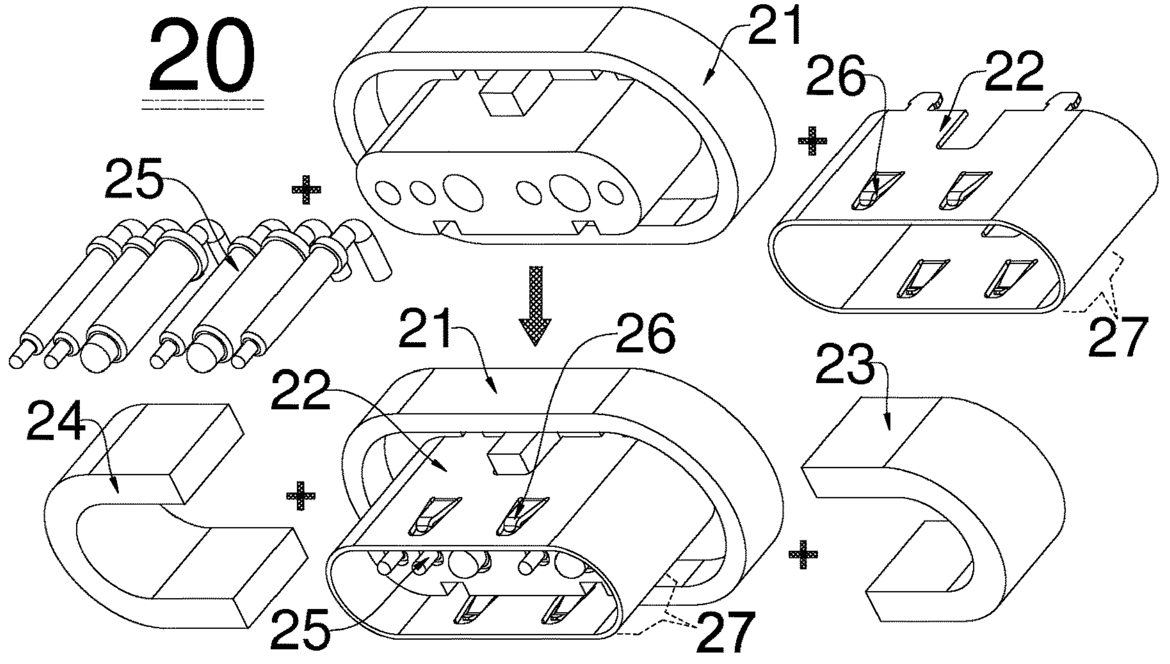
FIG. 4 is a mounting schematic diagram of a second connector according to one embodiment of the present disclosure.

Please refer to FIG. 4 which is a mounting schematic diagram of the second connector 20. The second connector 20 includes a second PIN module 25 disposed on a second plastic body 21 by the mounting process. The second plastic body 21 has the inner case 22, one end of the inner case 22 extends and protrudes outside the second plastic body 21 and the second plastic body 21 encompasses (covers) at the outside of the second PIN module 25. A third magnet 23 and a fourth magnet 24 are disposed on two sides of the second plastic body 21 and are disposed on one end of the inner case 22 far away from the second plastic body 21. The third magnet 23 and the fourth magnet 24 are closely adjacent to the second plastic body 21. A plurality of shrapnel 26 is disposed on the case sidewall of the one end of the inner case 22 far away from the second plastic body 21. Please refer to FIG. 6, and the end of the inner case 22 protrudes outside of the third magnet 23 and the fourth magnet 24. An inserting part 27 is disposed on one end of the inner case 22 extending outward and far away from the second plastic body 21, and a part of the inner case 22 protruding outside the third magnet 23 and the fourth magnet 24 forms the inserting part 27. The plurality of shrapnel 26 is located on the sidewall of the inserting part 27 of the inner case 22 protruding outside the third magnet 23 and the fourth magnet 24.

Figure 9:
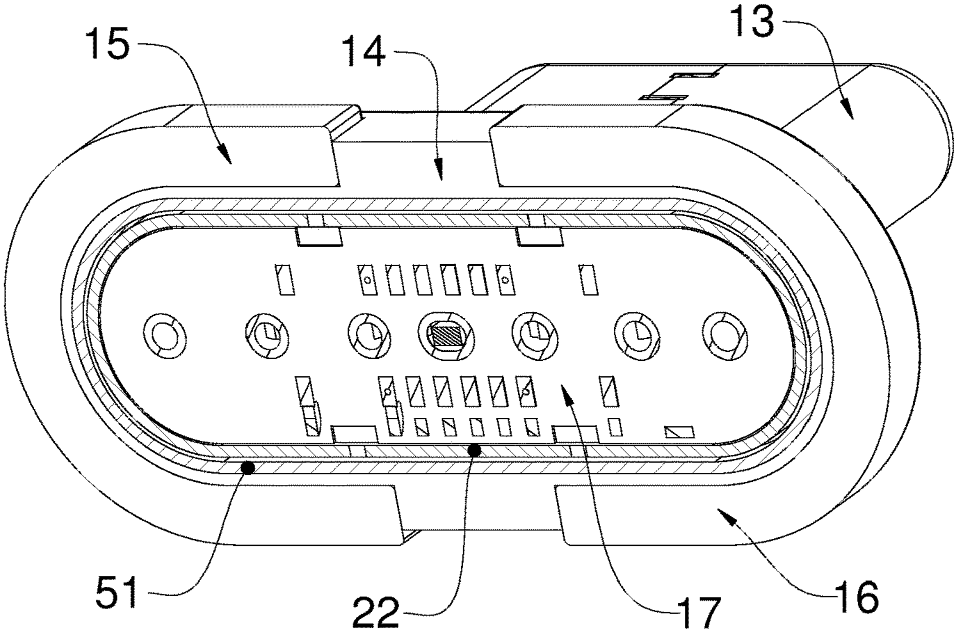
FIG. 9 is a partial cross section structural diagram of the fixed case according to one embodiment of the present disclosure.
Figure 11:
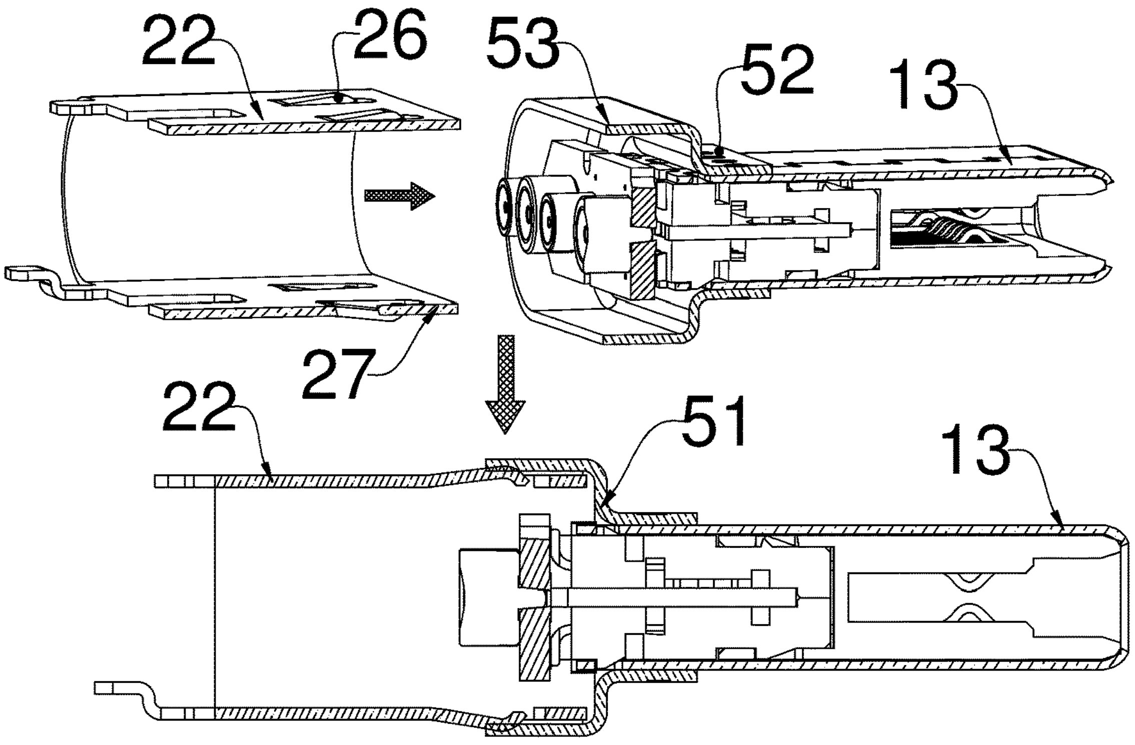
FIG. 11 is a schematic diagram of insertion of a case according to one embodiment of the present disclosure.

Please refer to FIG. 11, which is a schematic diagram of insertion of a case of the present disclosure. When the first connector 10 and the second connector 20 are jointed, the inserting part 27 of the inner case 22 is inserted (plugged) into the second annular portion 53, and the second PIN module 25 is disposed on the first PIN module 18 and contacts the first PIN module 18. The plurality of shrapnel 26 tightly contacts the inner wall of the second annular portion 53 to ensure the stability of contact between two iron cases with the grounded magnetic attraction heads of the connectors. The inserting part 27 and the second annular portion 53 are located between the first magnet 15, the second magnet 16 and the terminal of the PIN module. Please refer to FIG. 9, which is a partial cross section structural diagram of the fixed case 51. The inner case 22 is located between the first magnet 15, the second magnet 16, the third magnet 23, the fourth magnet 24, the first PIN module 18 and the second PIN module 25 to serve as the terminal preventing the static interference of the magnet, and the inner case 22 achieve EMI static shielding.

In another embodiment, there is no shrapnel 26 on the inner case 22. Please refer to FIG. 8, which is a structural schematic diagram of a fixed case 51 the present disclosure. A plurality of protrusions 54 protrude inward on the sidewall of the second annular portion 53. When the first connector 10 and the second connector 20 are connected by the insertion, the inserting part 27 of the inner case 22 is inserted (plugged) into the second annular portion 53, and the second PIN module 25 is disposed on the first PIN module 18 and contacts the first PIN module 18. The plurality of protrusions 54 tightly contacts the outer wall of the inserting part 27 to ensure the stability of contact between two iron cases with the grounded magnetic attraction heads of the connectors. The inserting part 27 and the second annular portion 53 are located between the first magnet 15, the second magnet 16 and the terminals of PIN module. In other words, the inner case 22 is located between the first magnet 15, the second magnet 16, the first PIN module 18 and the second PIN module 25, and it may achieve the shielding function of preventing the magnet from making the interference in the signal transmission of the terminals of PIN module.

Figure 6:
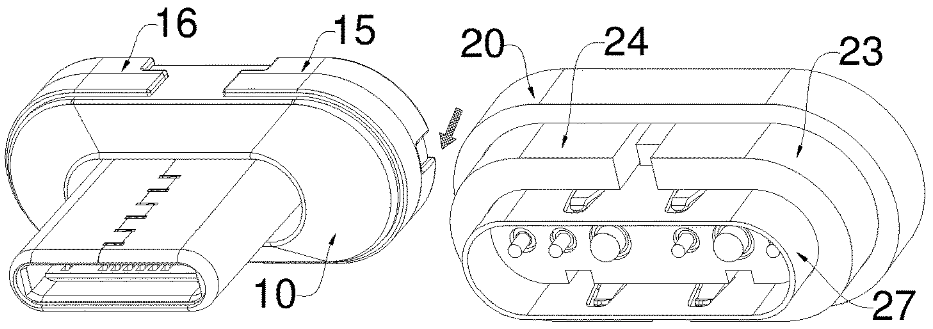
FIG. 6 is a jointing schematic diagram according to one embodiment of the present disclosure.
Figure 10:
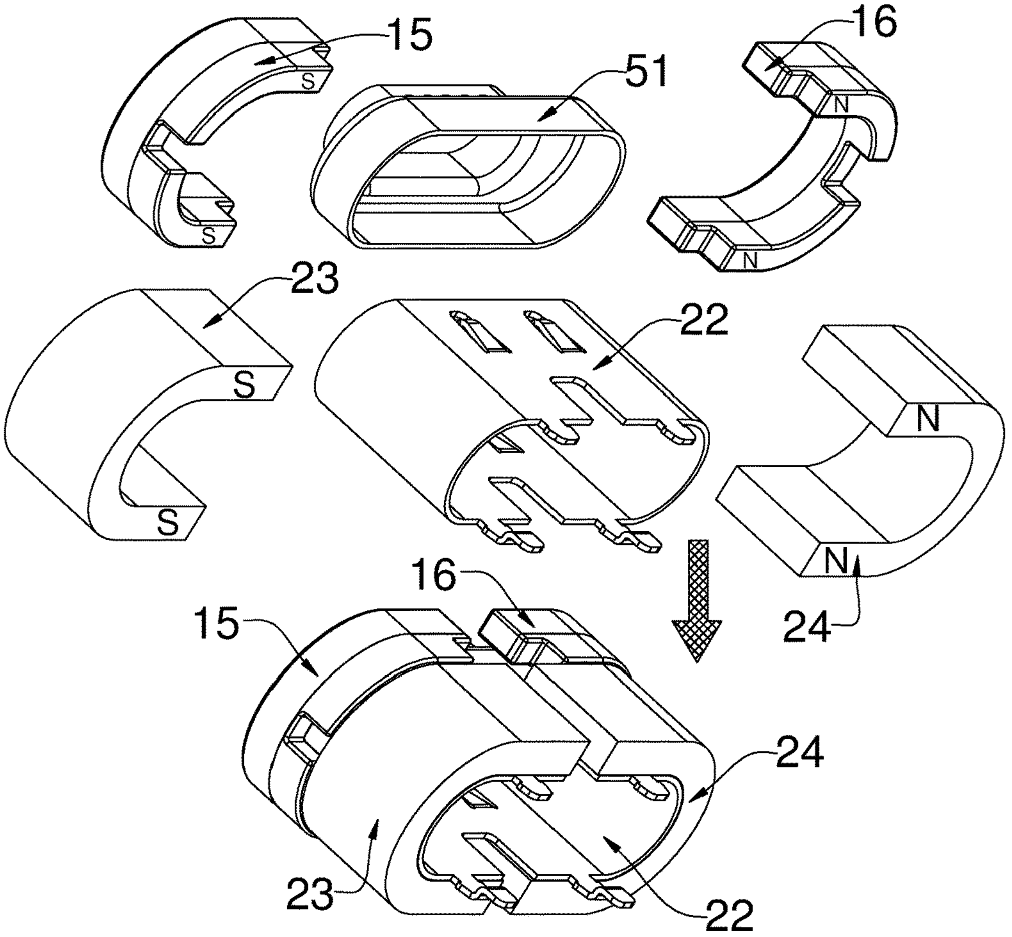
FIG. 10 is a schematic diagram of magnet polarities according to one embodiment of the present disclosure.

Please to refer to FIG. 6 and FIG. 10, which are a jointing schematic diagram of the present disclosure and a schematic diagram of magnet polarities according to one embodiment of the present disclosure. The magnet polarities are left and right distribution. One side face of the first magnet 15 close to the third magnet 23 is a south pole, and one side face of the third magnet 23 close to the first magnet 15 is a north pole. One side face of the second magnet 16 close to the fourth magnet 24 is the north pole, and one side face of the fourth magnet 24 close to the second magnet 16 is the south pole. In other words, one side face of the first magnet 15 far away from the third magnet 23 is a north pole, one side face of the third magnet 23 far away from the first magnet 15 is a south pole, one side face of the second magnet 16 far away from the fourth magnet 24 is the south pole, and one side face of the fourth magnet 24 far away from the second magnet 16 is the north pole. The magnetic connector assembly of the present disclosure with the fool-proofing and the shielding utilizes the principle of repelling between the magnets with same polarities to achieve the function of preventing the incorrect insertion and have the fool-proofing during connection.

In the connector of the present disclosure, at first, the conventional first connector 10 (the upright type c plug connector or the other connector) and the first PIN module 18 (POGO PIN) are manufactured alone, and then the type c plug connector, the POGO PIN and the PCB circuit board 17 are mounted together by SMT (surface mount technology) so that the type c plug connector and the POGO PIN are connected. Afterwards, the outer case 13 (shielding case) is invaginated and the outer iron case (the fixed case 51) of the type c plug connector and the outer case 13 is welded together by the laser. The plastic injection molding is performed on the tail of the connector of the present disclosure (first plastic body 14). At last, the inner side of the first magnet 15 and the inner side of the second magnet 16 are coated with the normal temperature curing glue and mounted on the first plastic body 14 (injection molding body), and the product of the first connector 10 is manufactured after curing.

The first magnet 15 and the second magnet 16 are mounted on the tail of the connector of the present disclosure (first plastic body 14), and the polarities of the first magnet 15 and the second magnet 16 in the insertion interface are different. Hence, the first magnet 15 and the second magnet 16 repel due the same polarity of two magnetic attraction heads if the first magnet 15 is reversely inserted into the second magnet 16, and the connector of the present disclosure is unable to work without the external interference. When the product is applied to the data transmission situation, the high frequency signal of the interior of the connector would make the interference on the external signals, and the grounded case (the outer case 13, the inner case 22, the fixed case 51) would shield the internal signals to meet the related requirements.

The aforementioned embodiments merely express the preferred implementation of the present disclosure, and the description of the aforementioned embodiments would be described in details. It should be appreciated that the present disclosure is not limited to the form disclosed by the present disclosure and should not be construed as the exclusion of the other embodiment. The present disclosure may be applied to various arrangement, modification, and environment, and may be modified by the teaching or the technology or the knowledge in the related art in the scope of the present disclosure and could not be construed as the limitation of the present disclosure. It should be noted that a person skilled in the art would have change and modification in the present disclosure within the idea of the present disclosure and the change and the modification implemented by the person skilled in the art with the spirit and the scope of the present disclosure should be included within the protection scope of the claims of the present disclosure. Hence, the protection scope of the present disclosure should be subject to the attached claims.

LIST OF REFERENCE SIGNS

10: first connector
11: plurality of terminals
12: insulation case
13: outer case
14: first plastic body
15: first magnet
16: second magnet
17: circuit board
18: first PIN module
19: terminal carrier
20: second connector
21: second plastic body
22: inner case
23: third magnet
24: fourth magnet
25: second PIN module
26: shrapnel
27: inserting part
29: jointing groove
51: fixed case
52: first annular portion
53: second annular portion
54: protrusion
55: step
57: middle partition

The invention claimed is:

1. A magnetic connector assembly comprising:

a first connector comprising a fixed case outside which a first plastic body with a jointing groove is disposed;

a circuit board disposed inside of the fixed case and having a first PIN module, wherein the fixed case, the circuit board and a part of the first PIN module are disposed in the first plastic body by mounting process; and a second connector comprising a second PIN module disposed on a second plastic body by mounting process, wherein the second plastic body is disposed with an inner case, and an inserting part is disposed on one end of the inner case extending outward and far away from the second plastic body;

when the first connector and the second connector are jointed, the inserting part of the inner case is inserted into the jointing groove, and the second PIN module contacts the first PIN module and is disposed on the first PIN module;

wherein the fixed case comprises a first annular portion, a second annular portion, and a step; an outer diameter of the second annular portion is greater than an outer diameter of the first annular portion, the step is disposed between the first annular portion and the second annular portion for connecting the first annular portion and the second annular portion, and inner surfaces of the step and the second annular portion are partially exposed in the jointing groove wherein the circuit board is disposed within the second annular portion, and the inner surface of the step close to an outer edge and an inner wall of the second annular portion are exposed in the jointing groove, and the first connector comprises:

a first magnet disposed on one side of the first plastic body; and a second magnet disposed on the other side of the first plastic body;

wherein the first magnet and the second magnet are disposed on one end of the first plastic body far away from the outer case and protruding outside of the first plastic body, and outer ends of the first magnet and the second magnet are higher than an outer end of the first plastic body.

2. The magnetic connector assembly according to claim 1, wherein the first connector comprises a plurality of terminals disposed in an insulation case outside which an outer case is disposed, the insulation case is disposed within the outer case, and one end of the outer case is fixed to the fixed case by welding.

3. The magnetic connector assembly according to claim 1, wherein the second connector comprises:

a third magnet disposed on one side of the inner case; and a fourth magnet disposed on the other side of the inner case;

wherein the third magnet and the fourth magnet are disposed on one end of the inner case far away from the second plastic body and closely adjacent to the second plastic body, and the inner case and the fixed case are located among the first magnet, the second magnet, the third magnet, the fourth magnet, the first PIN module and the second PIN module.

4. The magnetic connector assembly according to claim 3, wherein an end of the inner case protrudes outside of the third magnet and the fourth magnet and forms the inserting part, and the second connector further comprises:

a plurality of shrapnel disposed on a case sidewall of the one end of the inner case far away from the second plastic body and located on a sidewall of the inserting part of the inner case protruding outside the third magnet and the fourth magnet, wherein the plurality of shrapnel tightly contacts the inner wall of the second annular portion when the first connector and the second connector are jointed.

5. The magnetic connector assembly according to claim 3, wherein one side face of the first magnet close to the third magnet is a south pole, one side face of the third magnet close to the first magnet is a north pole, one side face of the second magnet close to the fourth magnet is the north pole, and one side face of the fourth magnet close to the second magnet is the south pole.

6. The magnetic connector assembly according to claim 3, wherein one side face of the first magnet far away from the third magnet is a north pole, one side face of the third magnet far away from the first magnet is a south pole, one side face of the second magnet far away from the fourth magnet is the south pole, and one side face of the fourth magnet far away from the second magnet is the north pole.

7. The magnetic connector assembly according to claim 1, wherein the inserting part of the inner case is inserted into the second annular portion, and the fixed case further comprises:

a plurality of protrusions protruding inward on a sidewall of the second annular portion and tightly contacting an outer wall of the inserting part when the first connector and the second connector are jointed.

8. A magnetic connector assembly comprising:

a first connector comprising a fixed case outside which a first plastic body with a jointing groove is disposed;

a circuit board disposed inside of the fixed case and having a first PIN module, wherein the fixed case, the circuit board and a part of the first PIN module are disposed in the first plastic body by mounting process; and a second connector comprising a second PIN module disposed on a second plastic body by mounting process, wherein the second plastic body is disposed with an inner case, and an inserting part is disposed on one end of the inner case extending outward and far away from the second plastic body;

when the first connector and the second connector are jointed, the inserting part of the inner case is inserted into the jointing groove, and the second PIN module contacts the first PIN module and is disposed on the first PIN module;

wherein the first connector comprises a plurality of terminals disposed in an insulation case outside which an outer case is disposed, the insulation case is disposed within the outer case, and one end of the outer case is fixed to the fixed case by welding;

wherein the circuit board is disposed on one end of the insulation case, a soldering terminal of each of the plurality of terminals is disposed on the circuit board, the first PIN module is disposed on one side of the circuit board far away from the plurality of terminals, and the first PIN module is disposed on the circuit board and is electrically connected to the circuit board, and the first connector comprises:

a middle partition disposed between adjacent two of the plurality of terminals; and a terminal carrier disposed outside the plurality of terminals, wherein the plurality of terminals and the middle partition are combined and embedded in the terminal carrier and outside of the terminal carrier is encased with the insulation case.

9. The magnetic connector assembly according to claim 8, wherein the second connector comprises:

a third magnet disposed on one side of the inner case; and a fourth magnet disposed on the other side of the inner case;

wherein the third magnet and the fourth magnet are disposed on one end of the inner case far away from the second plastic body and closely adjacent to the second plastic body, and the inner case and the fixed case are located among the first magnet, the second magnet, the third magnet, the fourth magnet, the first PIN module and the second PIN module.

10. The magnetic connector assembly according to claim 9, wherein an end of the inner case protrudes outside of the third magnet and the fourth magnet and forms the inserting part, and the second connector further comprises:

a plurality of shrapnel disposed on a case sidewall of the one end of the inner case far away from the second plastic body and located on a sidewall of the inserting part of the inner case protruding outside the third magnet and the fourth magnet, wherein the plurality of shrapnel tightly contacts the inner wall of the second annular portion when the first connector and the second connector are jointed.

11. The magnetic connector assembly according to claim 9, wherein one side face of the first magnet close to the third magnet is a south pole, one side face of the third magnet close to the first magnet is a north pole, one side face of the second magnet close to the fourth magnet is the north pole, and one side face of the fourth magnet close to the second magnet is the south pole.

12. The magnetic connector assembly according to claim 9, wherein one side face of the first magnet far away from the third magnet is a north pole, one side face of the third magnet far away from the first magnet is a south pole, one side face of the second magnet far away from the fourth magnet is the south pole, and one side face of the fourth magnet far away from the second magnet is the north pole.

13. The magnetic connector assembly according to claim 8, wherein the inserting part of the inner case is inserted into the second annular portion, and the fixed case further comprises:

a plurality of protrusions protruding inward on a sidewall of the second annular portion and tightly contacting an outer wall of the inserting part when the first connector and the second connector are jointed.

* * * * *